United States Patent [19]

Krakow

[11] 3,770,958

[45] Nov. 6, 1973

[54] INFRARED RADIATION DETECTION BY A MATCHED SYSTEM

[75] Inventor: Burton Krakow, Hopkins, Minn.

[73] Assignee: Honeywell Inc., Minneapolis, Minn.

[22] Filed: Jan. 5, 1972

[21] Appl. No.: 217,704

[52] U.S. Cl. .............................................. 250/339
[51] Int. Cl. .............................................. G01t 1/16
[58] Field of Search ............................... 250/83.3 H

[56] References Cited
UNITED STATES PATENTS
3,660,659   5/1972   Eisenman et al. ............. 250/83.3 H
3,662,171   5/1972   Brengman et al. ............. 250/83.3 H

*Primary Examiner*—James W. Lawrence
*Assistant Examiner*—Davis L. Willis
*Attorney*—Lamont B. Koontz et al.

[57] ABSTRACT

An infrared radiation detection system has a filter capable of transmitting infrared radiation in a passband of wavelengths common to a range of wavelengths in which a cooled detection system sensor is capable of sensing radiation. The filter is matched to the sensor by having a low emissivity in those continuous ranges of wavelengths (1) across which any detector element in the sensor is sensitive to impinging infrared radiation and (2) which overlap in any part any filter passband. The filter positioned in the field of view of the sensor so matched does not appear as a noise source to the sensor despite the filter not being cooled.

21 Claims, 6 Drawing Figures

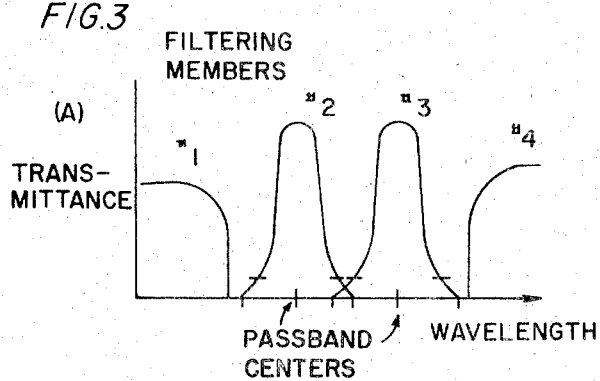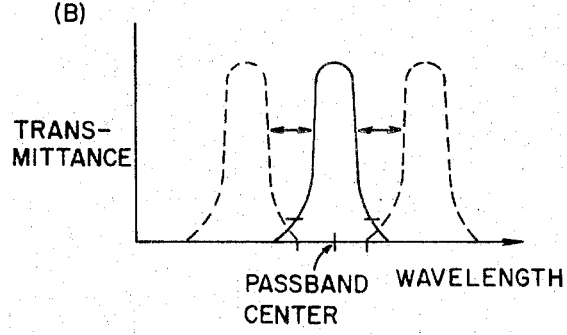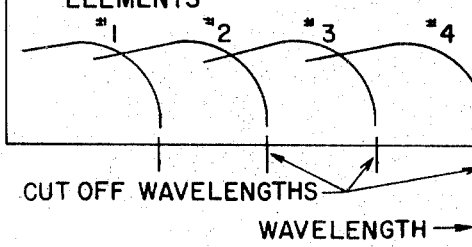

INFRARED RADIATION DETECTION BY A MATCHED SYSTEM

BACKGROUND OF THE INVENTION

This invention concerns the detection of infrared radiation.

Electromagnetic infrared radiation photons as subjects to be detected are emitted, reflected or transmitted by some physical objects of interest. To provide the best detection of such photons traveling from the objects of interest, the sensor of a detection system should provide an information signal based on impingement of only those photons traveling from such objects and further only those of wavelengths which interest the observer using the detection system. Any other impinging photons cause the sensor to provide a noise signal. This performance is approached by (1) minimizing the noise sources within the detection system and by (2) admitting as few photons as possible beyond the desired photons traveling from the physical objects of interest to the detection system.

The second design goal listed above of minimizing the external photons representing noise is commonly accomplished by limiting the field of view of the sensor within a detection system by an aperture providing only an adequate field of view of the physical objects of interest. Additionally, a radiation filter is placed in the field of view so that only radiation having wavelengths interesting to the observer reach the sensor within the detection system. Plating outward facing surfaces of the detection system with a low emissivity reflecting material is also used to reflect radiation away from the system at these locations.

The first design goal listed above, minimizing noise sources within the detection system, depends on reducing the radiation emitted within the system. The radiation emitted by bodies in general including those which constitute the elements of a detection system is expressed as a spectral radiant power per unit area per unit wavelength interval, i.e., the spectral radiant emittance. The spectral radiant emittance at wavelength $\lambda$, $I_\lambda$ is in turn expressed in the following formula:

$$I_\lambda = \epsilon_\lambda \, I_{B\lambda}$$

$\epsilon_\lambda$ is the emissivity of the material of the body at wavelength $\lambda$ and $I_{B\lambda}$ is the well known Planck function for radiation emitted by a blackbody at wavelenth $\lambda$. The emissivity is a fraction less than unity for physical bodies other than blackbodies and equals one for blackbodies. The emissivity depends on wavelength and temperature as well as on the material of which the body consists. The Planck function depends on temperature and wavelength.

To reduce the radiation emitted by the bodies constituting the elements of the detection system, detection system designs of the prior art have depended on lowering the temperature of the elements within the detection system which could emit radiation that would reach the sensor of the system. This is equivalent, primarily, to decreasing the value of the Planck function in the above equation. The sensor within the detection system, the aperture elements, the filter and any other appropriate component are usually cooled substantially in the low noise detection system designs shown in the prior art.

This cooling of the filter to reduce the radiation emitted by it is particularly disadvantageous in the operation of a detection system since it is often desirable to change filters to obtain a different passband of wavelengths of impinging radiation transmitted by the filter. To change the filter by opening a detection system access into cooled regions results in substantial heating of these regions and so sufficient time to cool the regions once again must elapse prior to use. Remote control by a filter changing mechanism requires both that moving parts operate at a very low temperature and that an increase in the cost and the system bulkiness be accepted.

SUMMARY OF THE INVENTION

The present invention has an uncooled infrared radiation filter placed across the aperture and outside the cooled region containing the sensor and some or all of the field of view limiting elements. The filter has one or more filtering members with a wavelength passband, in which passband the filtering member is capable of transmitting infrared radiation to the sensor from an external source. This wavelength passband is common at least in part to a sensitive range of wavelengths of a sensor. The sensor has one or more detector elements to be monitored which will respond to impinging infrared radiation in an effective sensitive wavelength range. Several such detector element effective sensitive wavelength ranges may be common to filtering member wavelength passbands. The filter portions in the sensor field of view, including at least one filtering member having passbands, have a wavelength range of low emissivity matched to include any of the effective sensitive wavelength ranges of the detector elements which are overlapped by any of the filtering member passbands. This arrangement has the advantage of reducing noise sources in the detection system due to the filter without having to cool the filter.

BRIEF DESCRIPTION OF THE DRAWINGS

FIG. 2 is a graph of two characteristics of a typical photon detector, FIG. 3 shows graphs of characteristics corresponding to two types of filters:

Figure 4:
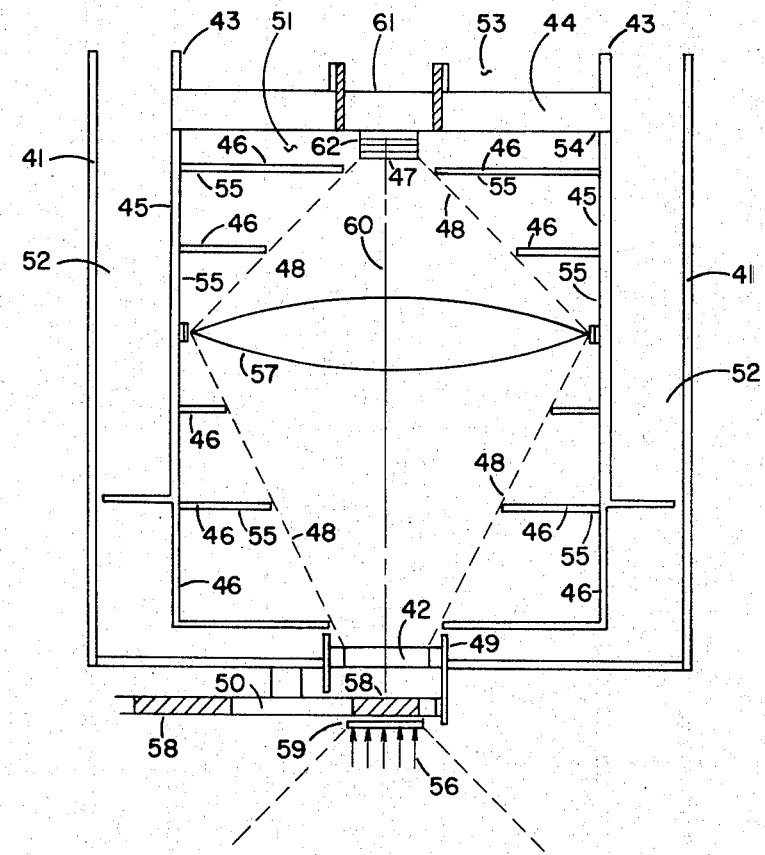

(a) multiple separate filters and (b) a continuously variable filter,

FIG. 4 is the internal view of another detection system constructed according to the present invention, FIG. 5 is a graph of characteristics of several photon detectors, and FIG. 6 is a graph of a resultant characteristic of two different photon detectors placed in sequence.

DESCRIPTION OF THE PREFERRED EMBODIMENTS

Figure 1:
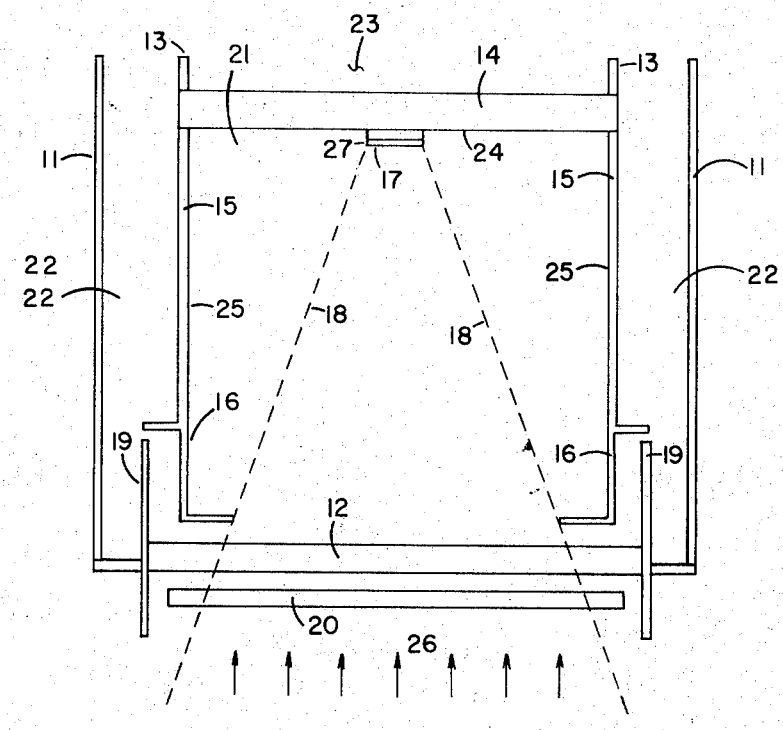
FIG. 1 is an internal view of a detection system constructed according to the present invention.

The detection system shown in the internal view in FIG. 1 represents an embodiment of the present invention. Outer enclosure wall 11 and the passage window 12 form the outer wall of a Dewar flask. Inner closure wall 13 and mounting plate 14 form the inner wall of the Dewar flask. Interior wall 15 and the baffle 16 attached thereto form an aperture means to leave only an aperture for passing radiation to limit the sensor field of view, i.e., paths that radiation received from outside the enclosure passing through the aperture may take to directly reach the sensor 17. The field of view is indicated by the dashed lines 18. Filter 20 is placed across the passage window 12.

Shield 19 is polished and plated with a low emissivity material such as gold on its surfaces as is the outer edge of the window 12. These surfaces thereby reflect rather than absorb any radiation entering at the juncture of the window 12, shield 19 and outer wall 11 or radiation emitted by the uncooled outer wall 11. The portion of shield 19 that is within the enclosure may be omitted if the interior surface of the outer enclosure wall 11 is plated with a low emissivity material.

Interior regions 21 and 22 are evacuated to minimize heat transfer between the outside of the enclosure and the cooled inner wall 13, mounting plate 14 and interior wall 15. Should the detection system be intended for use in space outside of the earth's atmosphere regions 21 and 22 need not be evacuated if they are vented to the outside of the enclosure. Since in such an application window 12 would not be needed to form an airtight enclosure, the omission of window 12 would be a satisfactory venting.

Cooling region 23 has a coolant such as liquid nitrogen or liquid helium within it in intimate contact with mounting plate 14. By cooling mounting plate 14, interior wall 15, baffle 16 and sensor 17 are also cooled through conduction. The cooling is provided to reduce the radiation emitted by these elements which might otherwise impinge on sensor 17. Cooling sensor 17 prevents the sensor from emitting radiation which could be reflected back to impinge upon itself.

Interior surfaces 24 and 25 are blackened and roughened to make them good absorbing surfaces and poor reflecting surfaces. As a result radiation not traveling directly to the sensor in the field of view will not be reflected to the sensor in any large amount from these interior surfaces.

Sensor 17 has as detector element 27 a photon detector of the photoconducting type having electrical leads not shown attached to it. Appropriate electrical circuits not shown can through the leads monitor sensor conductivity changes.

In operation, radiation 26 traveling toward the detection system is either (1) reflected or absorbed by outer enclosure wall 11, shield 19, interior wall 15, baffle 16 or mounting plate 14, or (2) reflected by filter 20, or (3) transmitted by both filter 20 and by window 12 and through the aperture formed by baffle 16 to impinge on sensor 17 or on interior surfaces 24 and 25. In the second and third situations, the radiation first encounters filter 20 which is typically of the well known interference filter type constructed of dielectric layers. Such filters have passbands which can be relatively narrow, i.e., in which a small spectral width of wavelengths will be transmitted.

The important feature of such filters for this purpose is that the filter will not transmit radiation of wavelengths outside this passband (in the stopband) but in blocking radiation of these wavelengths the filter will reflect such radiation, not absorb it. This is important because reflectivity is related to emissivity inversely for a given transmissibility. It is essential to the present invention that the filter materials be chosen to have a low emissivity across a range of wavelengths matched to include the range of wavelengths in which the sensor will effectively detect impinging radiation. The filter must not perform its filtering function in this range of wavelengths by the alternative means of absorption because a good absorber of radiation at any wavelength is also a good emitter of radiation at that wavelength. Thus, filtering must be done by reflection if low emissivity of the filter is to be achieved.

The above relationship between radiation absorption, emission and reflection are demonstrated in the following formulations. Radiation impinging on a surface must be either reflected, absorbed, or transmitted. Thus, if A stands for the fraction absorbed, R for the fraction reflected and T for the fraction transmitted, the three fractions must add up to one to account for all of the impinging radiation:

$$A + R + T = 1.$$

This equation must hold at each wavelength so that equation can be rewritten as follows:

$$A_\lambda + R_\lambda + T_\lambda = 1.$$

$A_\lambda$ is termed the spectral absorptance, $R_\lambda$ is termed the spectral reflectance and $T_\lambda$ is termed the spectral transmittance.

It is well known that the emissivity, $\epsilon_\lambda$, must equal the spectral absorptance, $A_\lambda$. Then the last equation can be rewritten as:

$$\epsilon_\lambda + R_\lambda + T_\lambda = 1.$$

It can be seen that the spectral transmittance, $T_\lambda$, and the spectral reflectance, $R_\lambda$, must nearly equal 1 in sum if the emissivity of filter layers is to be small. For the interference filter $T_\lambda$ should be large in the range of wavelengths in which the sensor is capable of detecting impinging radiation. The same considerations of transmittance and emissivity apply to the window 12.

The sensor 17 with a photon detector, detector element 27, will be capable of sensing the presence of impinging radiation 26 by absorbing photons to form electron-hole pairs over a range of wavelengths. In a photon detector the impingement of radiation photons is indicated by such changes in the energy state of the material used for sensing in response to the impinging photons. The attachment of electrical leads to the material and the material properly positioned in the sensor permits an effective sensitivity of the material to be determined through noting the electrical characteristic changes as a result of the energy state changes due to photons impinging on the sensor as a function of wavelength. Photon detectors depending on the photoconductive, photovoltaic, photoelectric, and photoelectric magnetic effects in materials are useful. Photoconductive photon detectors are convenient in this application.

For detection to occur, the filter passband must be set at least in part within the sensitive wavelength range of the sensor. If a passage window 12 is used, it must transmit radiation in at least this common range of wavelengths wherein the sensor and the filter cooperate.

The photoconducting mechanism in the detector material depends on some impinging radiation photons being energetic enough to produce electron-hole pairs, that is having an energy exceeding the energy gap of the detector material. In a simplified theory, the energy of the photon, $hc/\lambda$, must exceed the magnitude of the detector material energy gap, $E_g$, which can be expressed as:

$$hc/\lambda > Eg.$$

This then may be rewritten as: $\mu < hc/Eg$

Therefore, approximately, the wavelength of the impinging radiation must satisfy the above inequality if the sensor is to sense the presence of the impinging radiation photons. The longest wavelength which can be sensed is termed the cutoff wavelength and from the above theory is:

$$\lambda_c = hc/Eg.$$

Wavelengths longer than this will not be absorbed by the sensor but rather will be transmitted or reflected.

FIG. 2 shows graphs of typical characteristics of a photoconductor material as a photon detector. The specific detectivity or the effective relative absorption may be plotted on the ordinate versus wavelength on the abcissa to yield similar curves. Effective absorbtion is only that radiation absorbed which contributes to forming electron-hole pairs and so to altering the conductivity of the photoconducting detector material. Radiation of wavelengths longer than the cutoff wavelength is neither detected nor absorbed. Sensor 17 may have a blocking element positioned across the photon detector to prevent short wavelength infrared radiation from reaching the photon detector thereby limiting the sensor to an effective sensitive range of wavelengths in which it will respond to impinging radiation.

The detection system of FIG. 1 has a filter 20 a single fixed passband filter having a low emissivity in the effective sensitive range of wavelengths of sensor 17 and which is located outside of the cooled interior enclosure formed by outer wall 11 and window 12. Due to the low emissivity of the filter element, it need not be cooled to reduce its spectral radiant emittance as that quantity is already small at wavelengths in which the sensor can detect. The filter located in this position allows the filter element to be substituted for easily.

FIG. 3a shows a graph of the transmittance of four separate and distinct filter elements, filtering members 1 through 4, with there being fixed ranges of wavelengths for each member within which radiation will be transmitted by the member. The graph shows a passband of transmitted wavelengths for each of filtering members 2 and 3 formed around separate passband centers. Filtering members 1 and 4 transmit radiation of wavelengths shorter than a fixed wavelength value and of wavelengths longer than a fixed wavelength value respectively. Rather than having each filter element mounted in a separate interchangeable filter structure, they may be mounted in a structure as a single filter becoming members thereof and some filtering member position interchanging scheme may be used.

Another type of interference filter is the continuously variable filter. Such a filter is often constructed in a form of a strip with long sides that are circular arcs. Each portion between the long sides of such a strip forming a section of the strip transmits radiation of wavelengths peculiar to that portion of the strip. The strip can be constructed such that the shortest wavelengths are transmitted at one end of the strip and with radiation of larger and larger wavelengths being transmitted at points closer and closer to the other end of the strip.

FIG. 3b is a graph illustrating the nature of such a continuously variable filter. In this figure, transmittance is plotted on the ordinate versus both wavelength and path position plotted on the absissa. Path position refers to the position on a path from one end of the strip to another parallel to the long sides. It can be seen that the passband has a different center for each point on the path. If filter 20 of FIG. 1 is a structure containing one or more such strips, the filter being placed outside of the enclosure will permit different sections of the strip to be moved across the aperture formed by baffle 16. In this way each such strip section can become an effective filter section. Thus, the passband of wavelengths of radiation transmitted to sensor 17 may be varied by moving the strip. This type of filter is more conveniently constructed for and used in the system of FIG. 4 with its smaller aperture however.

The system shown in FIG. 4 is an embodiment of the present invention also but has a greater capability than the system shown in FIG. 1. Outer enclosure wall 41 and passage window 42 again form the outer wall of a Dewar flask. Inner enclosure wall 43 and mounting plate 44 form the inner wall of the Dewar flask. Interior wall 45 and the baffles 46 attached thereto form an aperture means and again limit the field of view 48 of the sensor 47. Shield 49 is polished and plated with a low emissivity material such as gold on its outer surface not in contact with the window 42 and the outer edge of the window is also polished and plated. The portion of shield within the enclosure may again be omitted if the interior surface of the outer enclosure wall 41 is plated with a low emissivity material.

Several baffles 46 are shown in the interior region 51 of this detection system rather than only one. These baffles have been inserted to provide as much absorbing surface as possible located outside the sensor field of view 48. The surfaces of these baffles are additions to interior surfaces 55 and interior surface 54 and all of these surfaces are blackened and roughened to again make them good absorbing surfaces and poor reflecting surfaces. Increasing the ratio of cooled absorbing surface area to the total area of relatively warm surfaces present increases the likelihood of absorbing radiation not traveling directly to the sensor prior to its ever being reflected to the sensor 47.

Cooling region 53 again contains a suitable coolant in intimate contact with mounting plate 44. Through conduction, interior wall 45 and baffles 46 are cooled in addition to mounting plate 44. The interior regions 51 and 52 are evacuated to minimize heat transfer. Again if the detection system is to be used outside the atmosphere of the earth, the evacuation can be provided by merely omitting window 42.

Cooling region 61 is shown separated from cooling region 53 to cool sensor 41 at a temperature differing from that to which the mounting plate 44 is cooled to improve sensor performance and/or system cooling efficiency. If this unnecessary, cooling region 61 need not be provided and sensor 47 may be cooled to the temperature of mounting plate 44.

The use of biconvex lens 57 permits the use of a smaller effective filtering areas in filter 50 placed across passage window 42 and a correspondingly smaller passage window and smaller aperture. The biconvex lens 57 serves as a directing means to direct radiation 56 passing through the filter and passage window to the sensor 47. The use of a bixonvex lens as such a directing means eases the problems of focusing and alignment. Other means such as a mirror system or a plano-convex lens can alternatively be used to direct the received radiation to the sensor 47. A mirror system has the advantages of being achromatic and adapting easily to a scanning system operation. A planoconvex lens will allow the construction of a compact system and provide more sensitive detection system operation. Biconvex lens 57 does not separate interior region 51 into two separate airtight compartments.

Filter 50 is shown to be in the form of a rotatable disc structure having the filtering members 58 located symmetrically with respect to the disc center such that all the members can be rotated to a position across passage window 42. The filtering members 58 may be separate filtering members each having a fixed range of wavelengths within which they are capable of transmitting radiation. The filtering members 58 may also be strips of a continuously variable filter with the long sides of the strip being in the form of circular arcs. Where a continuously variable filter is used, slit jaws 59 may be provided to limit the section of the continuously variable filter strip which can transmit received radiation 56 to passage window 42.

Operation of the detection system in FIG. 4 is similar to the detection system in FIG. 1 insofar as to the initial encounter between radiation 56 and the detection system itself. The radiation 56 is either (1) reflected or absorbed by outer enclosure wall 41, shield 49, interior wall 45, baffles 46 or mounting plate 44, or (2) reflected by filter 50 of slit jaws 59, or (3) transmitted by both filter 50 and by passage window 12 and through the aperture formed by baffle 46 to impinge on sensor 47 or on interior surfaces 54 and 55 and baffles 46. The filtering members 58 must again in the stopband reflect unwanted radiation rather than absorb it and so are typically of the well known interference filter type. If a passage window 42 is used it must also have low emissivity or absorption in the range of wavelengths to which sensor 47 is sensitive to radiation and preferably the passage window will have a high transmittance in this same range of wave-lengths. Generally, the filtering members 58 and the passage window 42 must have the characteristics discussed previously of the filter 20 and the passage window 12 respectively of the detection system of FIG. 1.

The requirement of matching a low emissivity or low absorption wavelength range of filter 50 with the radiation sensitive wavelength range of sensor 47, i.e., the photon detector, essential to this invention, is to be satisfied again in the detection system FIG. 4 but in a refined manner. The matching requirement can be refined by the use of a multiple detector element sensor as sensor 47 rather than the single detector element sensor of the detection of FIG. 1. A detector element is any element of the sensor that is to reflect, absorb, or transmit impinging radiation to aid directly in the detection of such radiation. Four detector elements 62 are shown in sensor 47 in FIG. 4. The use of such a multiple detector element sensor is desirable as it can provide a relatively high sensitivity over a wider range of wavelengths than can be provided by use of a single detector element sensor at present.

Referring again to FIG. 2, it can be seen that the detectivity of a single detector element is relatively high or peaks at wavelengths just shorter than the cutoff wavelength $\lambda_c$. The detectivity declines at shorter wavelengths. Single detector elements having a relatively long cutoff wavelength will be substantially less sensitive at shorter wavelengths. Detector elements that are quite sensitive at short wavelengths will also have a cutoff wavelength that is relatively short.

A composite sensor of several detector elements is known to give improved overall sensing performance. In such a sensor, each detector element is a photon detector having a different cutoof wavelength. The sensing material of a detection element will have two broad, major surfaces and will have a relatively small dimension therebetween. The sensor is constructed with the major surfaces of the sensing material of each detector element parallel to each other and with each element aligned along an axis with each of the other detector elements to form a layered structure. The first detector element as determined from the aperature side of the sensor has the shortest cutoff wavelength. Each succeeding element has in sequence a successively longer cutoff wavelength. The graph of the detectivities of four successive detector elements is shown in FIG. 5.

The graph of the effective relative absorption of a photon detector follows the graph of its specific detectivity since the impinging photons must be absorbed to provide the electron-hole pairs or other measurable phenomena to indicate the presence of impinging radiation. Therefore in the multiple detector element sensor described above, photons that are absorbed in detector elements prior to a given detector element will not reach that given detector element to be absorbed and thereby detected if the given detector element is being monitored. As a result, the detectivity of a detector element preceded by other detector elements is substantially effective only between approximately its own cutoff wavelength and the cutoff wavelength of the detector element immediately preceding it.

This is shown in FIG. 6 where the detectivity of detector element 4 as effective is approximated by subtracting the detectivity of detector element 3 from detector element 4 and plotting the result or the value zero, whichever is greater. It can be seen that the substantial effective sensitivity of any detector element in a multiple detector element sensor occurs near the peak of its individual detectivity characteristic thus giving good sensitivity over the entire wavelength range in which the multiple element is sensitive. Several successive detector elements therefore divide a large range of wavelengths into several subranges of wavelengths in each of which one detector element has a substantial effective sensitivity. If no other detector elements are used in the composite to block out some ranges of wavelengths these subranges will adjoin each other in succession to allow sensing across the large range of wavelengths. The use of unmonitored photon detectors or other detector elements to block or filter within the composite sensor will provide subranges in which no detector element has a substantial effective sensitivity.

Such a multiple detector element sensor is shown as sensor 47 in FIG. 4 where the several detector elements are aligned along optical axis 60. Each of the detector elements is a photon detector of the photoconducting type having electrical leads not shown to permit the monitoring of conductivity. For detection to occur, there must be coordination between the choice of filtering member 58 chosen to transmit radiation and the choice of the detector element of the sensor 47 to be monitored to determine the presence of received radiation having wavelengths within a specified interval. This coordination requirement is that at least a portion of some passband of a chosen filtering member must be within the range of wavelengths in which the detector element or elements chosen to be monitored have a substantial effective sensitivity. This overlap range of wavelengths will be the wavelength range in which the presence of received radiation can be detected.

With the above coordination requirement satisfied, the matching requirement becomes that the chosen filtering member itself and any other portion of the filter 50 simultaneously within the sensor field of view 48, i.e., exposed to the sensor, have low emissivities only within the range of wavelengths in which the detector element or elements being selectively monitored have a substantial effective sensitivity. The filtering member may be significantly emissive at all other wavelengths. This refined matching requirement is permitted because radiation emitted by the filtering member at shorter wavelengths is absorbed by detector elements ahead of the detector element being monitored. On the other hand, radiation emitted at longer wavelengths is transmitted or reflected by the detector element being monitored rather than being absorbed.

The advantage here of course is that the filtering members 58 need not have low emissivity over the entire sensing range of the multiple detector element sensor 47. Low emissivity is required only over the range of wavelengths in which the monitored detector element has a substantial effective sensitivity.

As an example to illustrate operation of the above system consider the detection system of FIG. 4 wherein filter 50 has in the disc structure three continuously variable filters each being a strip with the long sides in the form of circular arcs. The sensor 47 will have four detector elements of materials chosen to be sensitive to infrared radiation in the range of wavelengths in which the observer is interested. Detector elements of $Hg_{1-x}Cd_xTe$ can provide detection in the $2.5\mu$ to $15\mu$ wavelength range which will be chosen for this example. Detector elements of the various required cutoff wavelengths can be obtained by varying $x$ in the formula for each element. Wavelengths are in microns.

The mmatching of the filter strips with the detector elements will satisfy the refined matching requirement and will permit this detection system to operate generating low system noise despite the filter being uncooled. The four detector elements are chosen to have the cutoff wavelengths of $2.5\mu$, $5\mu$, $9\mu$, and $15\mu$ respectively and are the first, second, third, and fourth elements of a multiple detector element sensor with the first element being nearest the aperture.

The first continuously variable filter strip will be required to pass radiations of $2.5\mu$ at one end of the strip with the passband center varying continuously along the strip such that radiation of $5\mu$ is passed at the opposite end of the strip. The second strip will transmit $5\mu$ at its initial end and $9\mu$ at its opposite end while the third transmits $9\mu$ at its initial end and $15\mu$ at its opposite end. Thereby the filter is capable of transmitting in a passband the center of which can be varied from $2.5\mu$ to $15\mu$ overall. Each filter strip must be non-absorbing, i.e., nonemitting within the range of wavelengths that it transmits but can absorb or emit in the transmission wavelength ranges of the remaining two strips. Such filters are commercially available to order.

Since it is of interest to observe the impingement of radiation in the $2.5\mu$ to $15\mu$ range, the first element is never monitored for the presence of impinging radiation having wavelengths of $2.5\mu$ or less. However, it is included to block such radiation from reaching any of the other sensing elements. In this situation, the first detector element of the sensor need not actually be an absorbing element capable of being electrically monitored to detect impinging radiation but may be a blocking element of any materials which will block radiation of $2.5\mu$ or shorter wavelengths from reaching the second, third and fourth sensing elements and which will transmit longer wavelength radiation.

To investigate the presence of received radiation in a $2.5\mu$ to $5\mu$ range the second detector element is monitored for conductivity changes while the continuously variable filter strip covering the $2.5\mu$ to $5\mu$ range is rotated past the passage window 42. Radiation transmitted by the filter strip will be only radiation occurring within the adjoining range of wavelengths in which the second detector element has a substantial effective detectivity. Radiation emitted by the filter which is less than $2.5\mu$ in wavelength will be blocked by the first element of the sensor. Radiation of wavelength longer than $5\mu$ emitted by the filter will not effect the second detector element as the photons of such wavelengths will have insufficient energy to create an electron-hole pair in the second detector element. Such radiation will be primarily transmitted to the third detector element. Again, the filter must have low emissivity in the $2.5\mu$ to $5\mu$ wavelength range.

In a like manner, the impingement of radiation in the $5\mu$ to $9\mu$ range and in the $9\mu$ to $15\mu$ range can be investigated. In this manner, the entire wavelength range of $2.5\mu$ to $15\mu$ can be investigated to determine the presence of received radiation having wavelengths within this wavelength range.

The embodiments of the invention in which an exclusive property or right is claimed are defined as follows:

1. A system for infrared radiation detection comprising:

sensing means of the photon detector type sensitive to impinging infrared radiation in a spectrum of wavelengths having at least one detector element with a substantial effective sensitivity over a first subrange of wavelengths included within said spectrum, an enclosure having said sensing means mounted therein and provided with aperture means such that radiation originating from outside of said enclosure received therein is limited to being essentially radiation received through an aperture in said aperture means, cooling means to maintain interior surfaces of said enclosure near said sensing means and interior surfaces of said aperture means at a predetermined first temperature, and radiation filter means having a first filtering member selectively positionable across said aperture to transmit radiation to said enclosure of wavelengths included at least in part within said first subrange of wavelengths with said first filtering member and other portions of said radiation filter means exposed to said sensing means therewith having small emissivities over said first subrange of wavelengths.

2. The system of claim 1 wherein said sensing means comprises a plurality of detector elements each having at least one cutoff wavelength value and each positioned successively in a path followed by radiation received through said aperture and positioned in alignment with one another along an axis in sequence according to increasing cutoff wavelength values, beginning with a first detector element, such that said spectrum of wavelengths is divided into a plurality of subranges of wavelengths each determined approximately by a pair of said cutoff wavelength values with said first subrange of wavelengths being one of said plurality of subranges of wavelengths, said first detector element being nearest said aperture.

3. The system of claim 1 wherein means are provided to maintain said sensing means at a predetermined second temperature.

4. The system of claim 1 wherein said first filtering member is a separate filter element capable of transmitting radiation in a fixed range of wavelengths.

5. The system of claim 1 wherein said first filtering member is a continuously variable filter capable of transmitting radiation through a section thereof thereby determining a passband of wavelengths.

6. The system of claim 2 wherein said first filtering member is also capable of transmitting radiation at least in part within at least one of said subranges of wavelengths other than said first subrange of wavelengths with said first filtering member and other portion of said radiation filtering means exposed to said sensing means therewith having small emissivities over any of said subranges of wavelengths wherein said first filtering member is capable of transmitting radiation and wherein a said detector element being monitored has a substantial effective sensitivity.

7. The system of claim 2 wherein said radiation filter means has a plurality of filtering members each being selectively positionable across said aperture to transmit radiation to said enclosure including a second filtering member capable of transmitting radiation in a range of wavelengths included at least in part within one of said subranges of wavelengths other than said first subrange of wavelengths, and with any one of said plurality of filtering members and other portions of said radiation filtering means exposed to said sensing means therewith having small emissivities in any of said subranges of wavelengths wherein that one of said plurality of filtering members is capable of transmitting radiation and wherein a said detector element being monitored has a substantial effective sensitivity.

8. The system of claim 2 wherein said first detector element is a blocking element.

9. The system of claim 6 wherein all of said detector elements do not have an effective sensitivity in at least one of said subranges.

10. The system of claim 6 wherein said detector elements are selectively monitored.

11. The system of claim 6 wherein said detector elements are photoconductive types.

12. The system of claim 7 wherein said second filtering member is a separate filter element capable of transmitting radiation in a fixed range of wavelengths.

13. The system of claim 7 wherein said second filtering member is a continuously variable filter capable of transmitting radiation through a section thereof thereby determining a passband of wavelengths.

14. The system of claim 7 wherein all of said detector elements do not have an effective sensitivity in at least one of said subranges.

15. The system of claim 7 wherein said detector elements are selectively monitored.

16. The system of claim 7 wherein said detector elements are photoconductive types.

17. The system of claim 13 wherein means are provided for adjusting the size of said section through which radiation reaching said sensing means is transmitted.

18. A system for infrared radiation detection comprising sensing means of the photon detector type sensitive to impinging infrared radiation in a spectrum of wavelengths, said sensing means comprising a plurality of detector elements each having at least one cutoff wavelength value and each positioned successively in a path followed by radiation received through an aperture and positioned in alignment with one another along an axis in sequence according to increasing cutoff wavelength values, beginning with a first detector element, such that said spectrum of wavelengths is divided into a plurality of subranges of wavelengths each determined approximately by a pair of said cutoff wavelength values including a first sub-range of wavelengths, said first detector element being nearest said aperture;

an enclosure having said sensing means mounted therein and provided with aperture means such that radiation originating from outside of said enclosure received therein is limited to being essentially radiation received through said aperture located in said aperture means; and radiation filter means having an interference filter as a first filtering member selectively positionable across said aperture to transmit radiation to said enclosure in at least one preselected wavelength range included at least in part within said first subrange of wavelengths and to substantially block transmission of radiation to said enclosure of wavelengths included in said first subrange of wavelengths but which are not included in said preselected ranges of wavelengths.

19. The system of claim 1 wherein cooling means are provided to maintain interior surfaces of said enclosure near said sensing means and interior surfaces of said aperture means at a predetermined first temperature.

20. The system of claim 18 wherein said preselected wavelength range is at least in part within a second subrange of wavelengths and said radiation filter means substantially blocks transmission of radiation to said enclosure of wavelengths in any said subrange of wavelengths wherein said preselected range of wavelengths occur and wherein a said detector element being monitored has a substantially effective sensitivity.

21. The system of claim 18 wherein said radiation filter means has a plurality of interference filters as filtering members each being selectively positionable across said aperture to transmit radiation to said enclosure including a second filtering member capable of transmitting radiation in a range of wavelengths included at least in part within one of said subranges of wavelengths other than said first subrange of wavelengths, and with any one of said filtering members substantially blocking transmission of radiation to said enclosure of wavelengths in any of said subranges of wavelengths wherein that one of said filtering members is capable of transmitting radiation and wherein a said detector element being monitored has a substantially effective sensitivity.

* * * * *